United States Patent [19]

Takahira

[11] Patent Number: 4,742,858
[45] Date of Patent: May 10, 1988

[54] HEAVY-LOAD RADIAL TIRE WITH SPECIFIED STEEL BELT STRUCTURE

[75] Inventor: Koji Takahira, Nara, Japan

[73] Assignee: Toyo Tire & Rubber Company, Ltd., Osaka, Japan

[21] Appl. No.: 881,661

[22] Filed: Jul. 3, 1986

[30] Foreign Application Priority Data

Jul. 6, 1985 [JP] Japan ................. 60-148853

[51] Int. Cl.$^4$ ................. B60C 9/18; B60C 9/20
[52] U.S. Cl. ................. 152/536; 152/526
[58] Field of Search ............ 152/536, 526, 527, 534, 152/535, 529

[56] References Cited

U.S. PATENT DOCUMENTS 3,757,843  9/1973  Carr .................. 152/536 X
4,172,487  10/1979  Suzuki et al. ......... 152/536 X
4,526,217  7/1985  Maeda et al. ......... 152/536 X Primary Examiner—Michael Ball
Assistant Examiner—Geoffrey L. Knable
Attorney, Agent, or Firm—Finnegan, Henderson, Farabow, Garrett & Dunner

[57] ABSTRACT

A heavy-load radial tire, comprising three or four belt layers of steel cords laminated at a slight angle with respect to the tire circumference direction in the central part of the outside of a carcass. An intermediate belt layer adjacent to the outermost belt layer has a cord strength which is at least 1.2 times greater than that of an inscribed belt layer which is inscribed in said intermediate belt layer. The end number of the intermediate belt is reduced so that the belt strength of the intermediate belt layer is substantially equal to that of the inscribed belt layer.

6 Claims, 1 Drawing Sheet

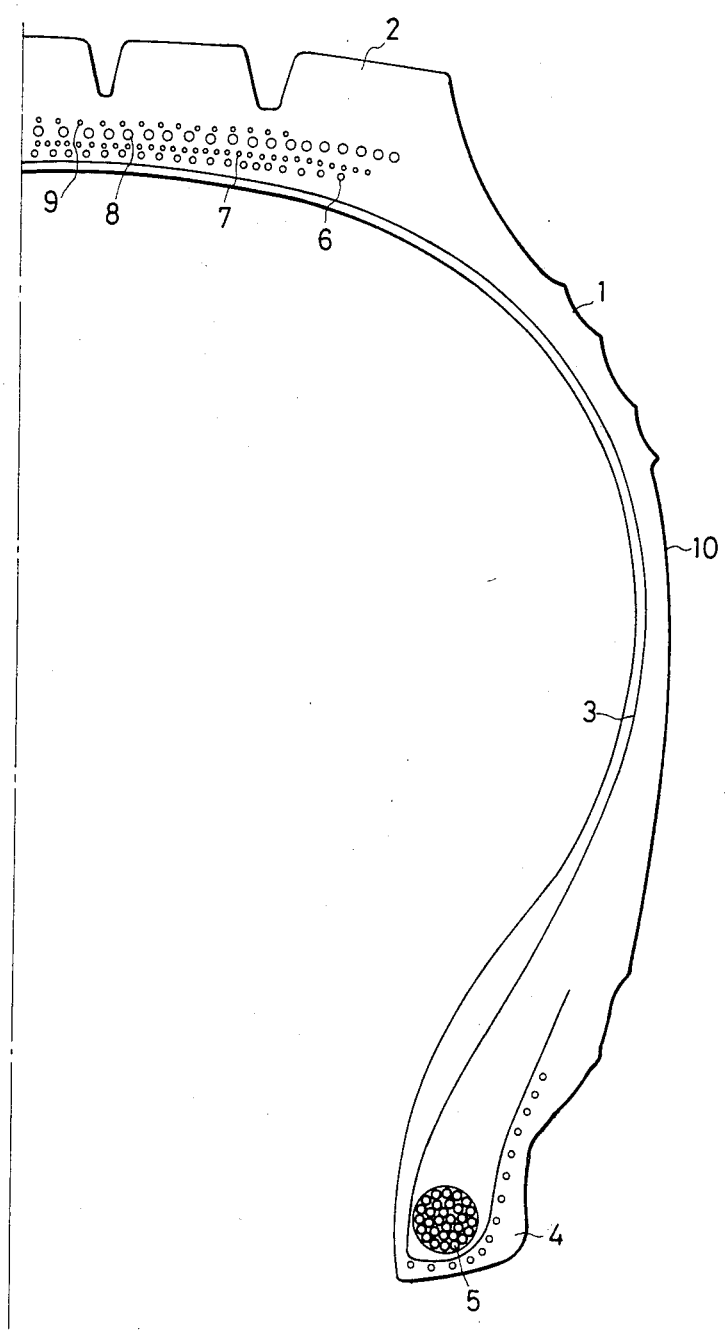

HEAVY-LOAD RADIAL TIRE WITH SPECIFIED STEEL BELT STRUCTURE

BACKGROUND OF THE INVENTION

This invention relates to heavy-load radial tires used for large vehicles such as trucks, buses and dump trucks.

In conventional heavy-load radial tires used for large vehicles such as trucks, buses and dump trucks, three or four belt layers of steel cords are laminated at an angle of 15 to 30 degress with respect to the tire circumference in the central part of the outside of a carcass-ply arranged perpendicular to the tire circumference. If a conventional radial tire is used for a long period of time, small cracks are formed at the cut end portions of the steel cords in the intermediate belt layer touching internally the outermost belt layer. The small cracks thus formed spread cooperating small cracks formed in the adjacent steel cords, so that the intermediate belt layer is separated from the tread crown part. This is caused by the fact that the end number of cords of the outermost belt layer is small and the cords are greatly spaced from one another, while the end number of cords of the intermediate cord layer is large similarly as in the end number of cords of the interior cord layer which is interior to the intermediate cord layer. This problem may be solved by decreasing the end number of cords of the intermediate belt layer and increasing the cord interval; however, the method suffers from the difficulties that the belt strength of the intermediate belt layer is decreased and accordingly the tire strength becomes insufficient.

OBJECT AND SUMMARY OF THE INVENTION

Accordingly, an object of the invention is to provide a heavy-load radial tire in which separation of the tire crown part from the cut end of the intermediate belt layer is prevented.

In order to solve the above-described problems, according to the invention, the end number of cords of the intermediate belt layer is reduced, and a decrease of the belt strength of the intermediate belt layer due to the reduction of the end number of cords of the intermediate belt layer is complemented by using steel cords larger in strength.

DESCRIPTION OF THE PREFERRED EMBODIMENT

A typical radial tire suitable for use with the present invention is shown in the accompanying FIGURE.

The tire 1 has a tread portion 2, side wall 10 and an inner carcass ply 3 that wraps around a bead wire 5 and runs from one bead part 4 of the tire to the other. In the tread portion running around the circumference of the tire are a plurality of belt layers 6, 7, 8 and 9.

According to the invention, three or four belt layers of steel cords, each layer having cords at a small angle with respect to the tire circumference, are laminated in the central part of the outside of the carcass ply. Of these belt layers, the intermediate belt layer adjacent to the outermost belt layer has a steel cord strength which is more than 1.2 times the cord strength of the interior belt layer interior to the intermediate belt layer. The end number of cords of the intermediate belt layer is made smaller than that of the interior belt layer to make the belt strength of the intermediate belt layer substantially equal to the belt strength of the interior belt layer.

In a conventional heavy-load radial tire, the steel cords of the belt layers are equal to one another in cord strength, generally in a range of 120 to 210 kg. On the other hand, in the heavy-load radial tire of the invention, the cord strength of the intermediate belt layer is more than 1.2 times that of the interior belt layer, preferably 1.3 to 1.7 times. If the cord strength of the intermediate belt layer is less than 1.2 times the cord strength of the interior belt layer, then it is not practical to reduce the end number of cords so much, and the effects of the invention cannot be obtained. If the cord strength of the intermediate belt layer is made excessively large, then the end number becomes smaller than that of the outermost belt layer, with the result that it is impossible to prevent the tire from being penetrated or cut by sharp obstacles such as nails and glass plates.

The heavy-load radial tire includes three or four belt layers. In the case of a heavy-load radial tire including four belt layers, the innermost belt layer laid on the carcass play is the first belt layer, the first belt layer is followed by the second and third belt layer in the stated order, and the outermost belt layer is the fourth belt layer. The third belt layer is the intermediate belt layer, and the second belt layer is the interior belt layer. In the conventional heavy-load radial tire, the interior belt layer is equal in end number to the intermediate belt layer; that is, the end number is in a range of 10 to 16 pieces per 25 mm, and the end number of cords of the outermost belt layer is 0.5 to 0.65 times that of each of the other belt layers. The heavy-load radial tire of the invention is so designed that the end number of cords of the intermediate belt layer is reduced in inverse proportion to the increase of the cord strength of the intermediate belt layer, and the belt strength of the intermediate belt layer is substantially equal to that of the interior belt layer.

As the cord strength of the intermediate belt layer is increased and the end number is decreased, the intervals of the cut ends of the cords of the intermediate belt layer are increased, and the belt strength of the intermediate belt layer is substantially equal to that of the conventional one.

A "1000R20-14PR" radial tire having a carcass ply and belt layers indicated in the following Table 1 was manufactured:

TABLE 1

|  | Cord Structure | Cord Strength (kg) | End Number (pieces/ 25 mm) |
| --- | --- | --- | --- |
| Carcass ply | 3 + 9 + 15 × 0.175 + 1 | 180 | 13 |
| 1st belt layer | 3 × 0.20 + 6 × 0.38 | 180 | 13 |
| 2nd belt layer | 3 × 0.20 + 6 × 0.38 | 180 | 13 |
| 3rd belt layer | 3 + 9 + 15 × 0.23 + 1 | 300 | 7.9 |
| 4th belt layer | 3 × 0.20 + 6 × 0.38 | 180 | 7.9 |

As is apparent from Table 1, the carcass ply, the first belt layer and the second belt layer have a belt strength of 2340 kg/25 mm, the third belt layer has a belt strength of 2370 kg/25 mm, and the fourth belt layer has a belt strength of 1422 kg/25 mm. For comparison, a radial tire was manufactured which was different from the above-described concrete example only in that the third belt layer was equal to the first belt layer in cord structure and in end number.

The results of the running test of the concrete example and the comparison example are as indicated in the following Table 2:

TABLE 2

|  | Concrete Example | Comparison Example |
|---|---|---|
| Drum running test | 136 | 100 |
| Road running test | 141 | 100 |

In the "drum running test" column, the running period of time of the concrete example which elapsed until the peeling of the tire crown occurred with a drum circumferential speed of 100 km/hour is indicated with the running period of time of the comparison example obtained under the same conditions set to 100. In the "road running test" column, the running distance at which the concrete example attached to a 11-ton truck became unserviceable is indicated with the running distance of the concrete example obtained under the same conditions set to 100.

The service life of the heavy-load radial tire of the invention until its breakage is longer than that of the conventional one.

I claim:

1. A heavy-load radial tire comprising three belt layers of steel cords including an interior belt layer, an intermediate belt layer and an outermost belt layer, the cords of each belt layer being at a small angle with respect to a tire circumference direction, said belt layers being laminated in a central part of the outside of a carcass, wherein the intermediate belt layer which is adjacent to the outermost belt layer has a cord strength which is at least 1.2 times greater than that of the interior belt layer which is adjacent and radially inside said intermediate belt layer, and the end number of said intermediate belt layer is smaller than that of said interior belt layer such that the belt strength of said intermediate belt layer is substantially equal to that of said interior belt layer.

2. A heavy-load radial tire as claimed in claim 1, in which the cord strength of said intermediate belt layer is less than 1.5 times that of said interior belt layer.

3. A heavy-load radial tire as claimed in claim 1 or 2, in which the cord strength of said interior belt layer is in a range of from 120 kg to 210 kg.

4. A heavy-load radial tire comprising:
at least four belt layers of steel cords, the cords of each belt layer being at a small angle with respect to a tire circumference direction, said belt layers being laminated in a central part of the outside of a carcass and having
an outermost belt layer,
an intermediate belt layer adjacent the outermost layer,
an interior belt layer adjacent and radially inside the intermediate belt layer, and
at least one other belt layer between the interior layer and a carcass,
wherein the intermediate belt layer has a cord strength at least 1.2 times greater than the cord strength of the interior belt layer, and an end number that is smaller than that of the interior belt layer such that the belt strength of the intermediate belt layer is substantially equal to the belt strength of the interior layer.

5. A heavy-load radial tire as claimed in claim 4, wherein the cord strength of the intermediate belt layer is 1.3 to 1.7 times the cord strength of the interior belt layer.

6. A heavy-load radial tire as claimed in claim 5, wherein the cord strength of the interior layer is in a range of from 120 kg. to 210 kg.

* * * * *